US012663799B2

(12) United States Patent
Govers, III et al.

(10) Patent No.: US 12,663,799 B2
(45) Date of Patent: Jun. 23, 2026

(54) DIGITAL CO-PILOT

(71) Applicant: Textron Innovations Inc., Providence, RI (US)

(72) Inventors: Francis X. Govers, III, North Richland Hills, TX (US); Kevin Christensen, Plano, TX (US)

(73) Assignee: Textron Innovations Inc., Providence, RI (US)

(*) Notice: Subject to any disclaimer, the term of this patent is extended or adjusted under 35 U.S.C. 154(b) by 152 days.

(21) Appl. No.: 18/640,941

(22) Filed: Apr. 19, 2024

(65) Prior Publication Data

US 2025/0328130 A1 Oct. 23, 2025

(51) Int. Cl.
| | |
|---|---|
| *G05D 1/20* | (2024.01) |
| *G05D 101/10* | (2024.01) |
| *G05D 109/20* | (2024.01) |
| *G08G 5/34* | (2025.01) |

(52) U.S. Cl.
CPC .................. *G05D 1/20* (2024.01); *G08G 5/34* (2025.01); *G05D 2101/10* (2024.01); *G05D 2109/20* (2024.01)

(58) Field of Classification Search
CPC .. G05D 1/20; G05D 2101/10; G05D 2109/20; G08G 5/34
See application file for complete search history.

(56) References Cited

U.S. PATENT DOCUMENTS

2024/0339039 A1* 10/2024 Arteaga .................. H04L 51/02

* cited by examiner

*Primary Examiner* — Michael D Lang
(74) *Attorney, Agent, or Firm* — Slater Matsil, LLP

(57) ABSTRACT

A system and method for a digital co-pilot are provided. The method includes receiving a plurality of inputs from a vehicle operating systems, wherein the plurality of inputs comprise engine parameters, control system parameters, or electrical system parameters, identifying one or more first trends in the plurality of inputs, diagnosing one or more first potential conditions based on the first trends, determining a first course of action based on diagnosing the one or more potential conditions, and generating one or more first commands to vehicle controls based on determining the first course of action.

20 Claims, 7 Drawing Sheets

DIGITAL CO-PILOT

TECHNICAL FIELD

The present invention relates generally to a system and method for a digital co-pilot (DCP), and, in particular embodiments, to a system and method for a digital co-pilot to assist with the proper operation of a vehicle such as an aircraft, and to simplify vehicle operation by ingesting commands, determining a course of action, and interfacing with vehicle systems to carry out the determined course of action with minimal human interface necessary.

BACKGROUND

The training and certification of industrial grade artificial intelligence (AI) or machine learning (ML), for aerospace applications in particular is difficult and expensive. Concerns about AI/ML technologies have led government agencies, such as the European Union Aviation Safety Agency, to add requirements for learning process verification for training AI or ML agents.

However, the nature of AI and ML agents allows for the addition of redundancy to a vehicle operating center, for example, the cockpit in an aircraft, to increase safety, mitigate casualties, identify potentially unsafe conditions, and simplify vehicle operation at a fraction of the time required for human interface. Slow moving trends that would be nearly impossible for humans to recognize may be identified with the assistance of AI and ML agents. Further, new AI and ML agents may be trained in a fraction of the time required for a human pilot, potentially operating in simulated environments over thousands of real-world hours in mere hours or days. Accordingly, it is highly desirable to determine a system that can incorporate these AI or ML agents into vehicle operation, while gaining the approval of government agencies.

SUMMARY

In a first possible embodiment, a system is provided, including, at least one processor, a first artificial intelligence (AI), where the first AI is trained based on a linguistic data set, air traffic control annotated data set, and an aeronautics data set, where the first AI is tuned using one or more check flights with a human copilot, and where the first AI further includes an aeronautical database and is trained to perform in-flight route re-planning, and at least one non-transitory computer readable memory connected to the at least one processor and including computer program code, where the at least one non-transitory computer readable memory and the computer program code are configured, with the at least one processor, to cause the system to perform at least receiving a plurality of inputs from a vehicle's operating systems, where the plurality of inputs include engine parameters, control system parameters, or electrical system parameters, identifying first trends in the plurality of inputs, sending the first trends to the first AI, diagnosing, by the first AI, one or more potential first conditions based on identifying the first trends in the plurality of inputs, determining, by the first AI, a first course of action based on diagnosing the one or more potential first conditions, generating, by the first AI, one or more first commands to vehicle controls based on determining the first course of action, and executing the first commands to control the vehicle operation.

In a second possible embodiment, a digital co-pilot system is provided, including a first processing agent that receives input from a plurality of vehicle systems and is trained to recognize and report a trend in data from the vehicle systems, a second processing agent that receives data regarding the recognized trend from the first processing agent, where the second processing agent is configured to diagnose a first potential condition related to the received data regarding the recognized trend, provide a first recommended course of action based on diagnosing the first potential condition, and send one or more commands to a course of action execution module based on the first recommended course of action, and the course of action execution module that interfaces with control system of the vehicle to cause the vehicle to execute the one or more commands based on the first recommended course of action.

In a third possible embodiment, a method is provided, including receiving a plurality of inputs from a vehicle operating systems, where the plurality of inputs include engine parameters, control system parameters, or electrical system parameters, identifying one or more first trends in the plurality of inputs, diagnosing one or more first potential conditions based on the first trends, determining a first course of action based on diagnosing the one or more potential conditions, and generating one or more first commands to vehicle controls based on determining the first course of action.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
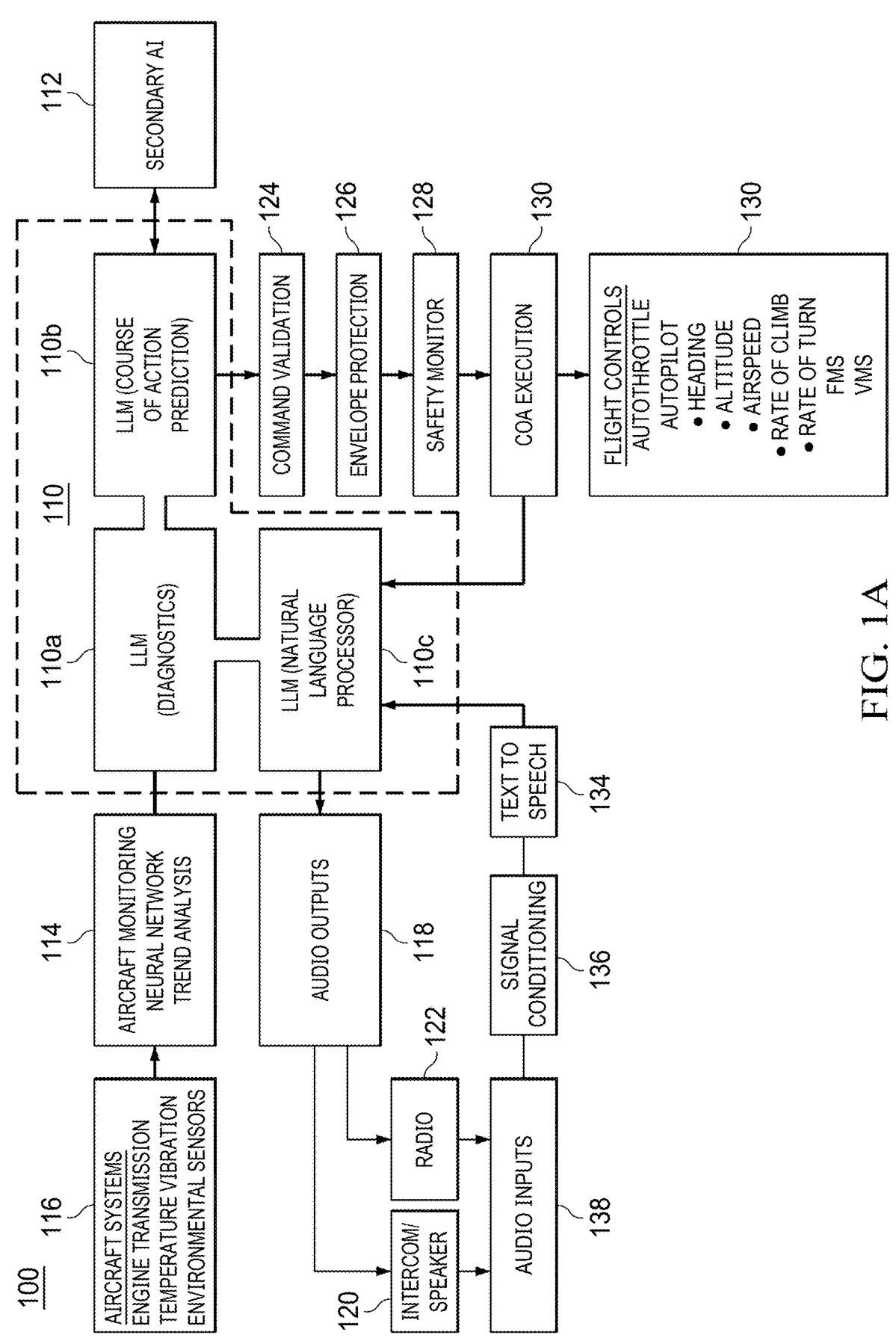
FIG. 1A is a symbolic diagram representing an AI-powered DCP 100 according to some embodiments.

Representative embodiments of systems and methods of the present disclosure are described below. In the interest of clarity, features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

The increasing use of automated systems for vehicle, and for aircraft, drones, self-driving automobiles, and the like has increasingly relied on artificial intelligence (AI) for vehicle features such as vehicle movement automation, object avoidance, pilot assistance, flight stability, or other automated intelligent processes. AI systems may be tasked with handling processes such as automated landings or landing approaches, object recognition for object avoidance, navigation, object identification or classification for threat detection, friendly vehicle identification, or the like.

Creation of an AI-powered digital co-pilot (DCP) capable of most of the functions of a human co-pilot, in a fraction of the time required by a human operator, is highly desired to add redundancy to the cockpit and improve overall safety. AI-powered digital co-pilot systems may be used to monitor, diagnose, and respond to aircraft contingencies and emergencies, including performing checklists, interfacing to avionics and navigation systems, talking and responding to air traffic control (ATC) instructions, and flying the aircraft.

A fully functional DCP goes far beyond what an autopilot can do. Not just automating flight, the DCP has an "understanding" of flight, flight dynamics, the aircraft systems, limits and capabilities. The DCP monitors the aircraft in real time and diagnoses trends, data readings, and sensors to detect incipient failure in advance-even trends too slow or too faint for a human pilot to notice.

With an integrated speech processor, the DCP is further capable of turning voice commands directly into actions, such as "load the ILS approach for runway 16 Left," or "plot a course to the nearest airport." The DCP has correct checklists and procedures ready to go when an emergency occurs, and can provide advice on how to proceed, answering such questions as "is this runway long enough," and "do we have enough fuel for that."

A DCP is further able to communicate with ATC and record and recall all radio traffic, as well as interfacing with aircraft communications system to perform action requested by the pilot such as contacting specific air traffic or tower authorities, tuning radios, or even interfacing with the autopilot systems to fly the aircraft. The DCP can also facilitate communications on extra channels for text and voice message to or from dispatch and maintenance. Accordingly, AI or ML powered DCP can simplify vehicle operation, result in increased safety and efficiency, allow for more time for human operators to focus on actual operation of the vehicle or aircraft (as opposed to splitting focus on administrative or button-pushing side-tasks), and add further on-demand redundancy without the expense and time necessary to train further human operators.

The principles presented herein relate to an environment for training and certifying AI-powered DCP agents. This training and certification environment is modular and templatized, permitting components can be quickly recycled for use in novel AI applications for different capability requirements. In some embodiments, the system may include software development and testing phases that include controlled development and testing of software that uses AI agents, and for the AI agents themselves. The system may also include capability specific AI training, validation and system testing phases. Additionally, the system provides for customized training that iteratively evaluates the training process, and generates training data customized for the desired capabilities of an AI agent. AI models can then be manually adjusted and tuned for proper responses through the performance of both simulated and real check flights. The data related to the training process, as well as the training data, may be stored for analysis and for validation of the training process and trained AI agents by regulatory authorities. This architecture for the machine or AI teaching environment is intended to meet requirements laid out by the European Union Aviation Safety Agency (EASA) and that are being adopted by the Federal Aviation Administration (FAA).

Thus, the systems and methods described herein may also provide for an environment for training and evaluating AI-powered DCP agents using a modular architecture designed for EASA or FAA certification compliance with automated record keeping and tracking of training data for EASA and FAA certification.

FIG. 1A is a symbolic diagram representing an AI-powered DCP 100 according to some embodiments. The DCP 100 comprises three distinct AIs—a primary AI 110, a secondary AI 112, and a system monitoring AI 114, in some embodiments. In some embodiments, the primary AI 110 and secondary AI 112 are large language model (LLM) neural networks that can be separated into three logical functions, including the diagnostic function 110a, the course of action prediction function 110b, and the natural language processing function 110c. The training and operation of each of these AIs is discussed further below. For the sake of simplicity, only the primary AI 110 is separated into its logical functions in FIG. 1A. The secondary AI 112 and system monitoring AI 114 may be trained in a similar manner, and the secondary AI 112 may be separated into similar logical functions as the primary AI 110, or comprise a subset of the logical functions implemented in the primary AI 110.

The system monitoring AI 114 receives aircraft systems inputs 116 and is trained to diagnose and recognize trends, faults, and alarm conditions. Aircraft system inputs 116 include such items as power produced by each engine; transmission system parameters; fuel flow and tank levels; temperatures of various systems, fluids, and exhausts; hydraulic pressures and fluid levels; power distribution and component status of various parts of the electrical system; the health of communication, navigation, and surveillance systems; radar, LIDAR, and television signaling for monitoring the outside environment; datalinks for weather, obstacle, and threat data from outside sources (e.g., wingmen, air traffic control (ATC), satellite feeds, and the like); onboard databases such as digital terrain elevations databases (DTED) to monitor terrain and obstacles; health usage monitoring system (HUMS) information or data; and the like.

These inputs are fed into the trained system monitoring AI 114, which can then recognize trends in the aircraft system and develop a common operating picture (COP) of the aircraft's operating environment. The trend may be slow, for example over multiple hours, flights, or even days. The trend, and rates identified by the system monitoring AI can then be fed into the primary AI 110 and secondary AI 112. Additionally, if parameters drop below (or rises above) a threshold (or rate thresholds), the system monitoring AI 114 may issue alarm conditions to the primary AI 110 and secondary AI 112.

In the case of HUMS data, HUMS data is typically taken within regimes or capture windows associated with specific operating ranges, such as ranges of operational parameters (e.g., airspeed between 100-130 kts, torque within a particular range, and the like). This is done to provide a repeatable reference condition and to ensure that data from different acquisitions are comparable so that any changes in the data are due to component degradation, rather than operational parameters. For example, a rotorcraft at hover may exhibit greater transmission system vibration, but less airframe vibration, than the same rotorcraft operating at maximum forward airspeed. Vibration data or features may be correlated with the operational parameters. Accordingly, the system monitoring AI 114 can assist in identifying trends within the HUMS data that may escape human or deterministic detection systems.

The diagnostic function 110a of the primary AI 110 may take the trends, faults, and alarms shown by the system monitoring AI 114 and determine the possible conditions that could be related to the identified trends, faults, and alarms based on its training. In some embodiments, the diagnostic function 110a may be performed by feeding inputs from the system monitoring AI 114 through the trained filters of the primary AI 110. Based on the trained weights and filters of the primary AI 110, an output will be formulated by the primary AI 110 predicting a possible condition related to the inputs. In embodiments where the primary AI 110 and system monitoring AI 114 are implemented on separate hardware, the trends, faults, and alarms from the system monitoring AI 114 may be transferred as data via data lines, a bus, or the like. In some embodiments, where hardware architecture is shared among AIs of the DCP 100, information representing the trends, faults, and alarms from the system monitoring AI 114 may be fed as inputs into the primary AI 110 and/or secondary AI 112, stored in local memory or cache, or the like. A range of possible conditions may be predicted. If the conditions meet a threshold possibility, those potential causes exceeding the probability threshold may be reported to one or both the course of action prediction function 110b of the primary AI 110 and the natural language processing function 110c.

The course of action prediction function 110b determines the proper recommended procedures for responding to the identified conditions. In some embodiments, information representing the identified condition from the diagnostic function 110a of the primary AI 110 may be fed into the course of action prediction function 110b of the primary AI 110, and matched to a recommended course of action based on the training of the primary AI 110. The recommended course of action may comprise a single command, or may be a procedure, or list of commands, or the like. In some embodiments, the recommended course of action may additionally include pilot or crew audible to visual notifications, or require input from the pilot or crew before being issued for action. In some embodiments, the audible notification may comprise a challenge-response format (e.g., pilot commanding "flaps", and the digital co-pilot responding "down"). In some embodiments, time critical responses may bypass, eliminate, or otherwise not require pilot confirmation if action is necessary within a given time period, or if certain conditions exist. For example, pilot confirmation may not be required in the event of a collision detection event to begin maneuvering flight controls, or when vehicle recovery actions are necessary. Data may be transferred between the diagnostic function 110a and the course of action prediction function 110b by storing information in a memory, transferring data information over a data line or bus, feeding data to the course of action prediction function 110b through procedural calls, or the like.

The natural language processing function 110c may formulate text dialog to the audio outputs 118 to inform the captain, crew, air traffic control, and/or the passengers of the situation through an intercom/speaker 120 or one or more attached radios 122. The audio outputs 118 is responsible for translating the text dialog from the natural language processing function 110c to audio data suitable for inputting to the intercom/speaker 120 or one or more attached radios 122.

The natural language processing function 110c of the primary AI 110 generates dialog for sending out to various entities, including the pilot, crew, passengers, air traffic control, and/or other aircraft. However, in addition, the natural language processing function 110c receives inputs from the intercom/speakers 120 and radios 122 of the aircraft to receive audio. In some embodiments, the output of the intercom/speakers 120 and radios 122 may be fed into audio inputs 138 of the DCP 100. The audio data is then processed through a signal conditioning function 136 that may amplify, filter, and otherwise process the audio signals for example, for translation to text. The text to speech function 134 translates the audio data into text data usable by the natural language processing function 110c of the primary AI 110 (and secondary AI 112). In such a manner, the DCP 100 receives audio commands from a pilot, such as "load the ILS approach for runway 16 Left," or "plot a course to the nearest airport," or air traffic control (ATC) if necessary (e.g., when both pilots are incapacitated). In some embodiments, commands from an ATC authority may require confirmation of pilot or crew incapacitation, the use of authentication codes, other forms of verification, or the like.

In some embodiments, the primary AI 110 may be trained on referencing a variety of materials, including operating procedures, casualty procedures, technical manuals, or the like. In some embodiments those reference materials may be included in databases within the DCP 100, or they may be implemented as separate databases accessible to the DCP 100.

In some embodiments, the secondary AI 112 receives the same inputs as the primary AI 110, and makes an independent analysis of the potential causes and conditions that may exist based on the trends, alarms, and faults received from the system monitoring AI 114. The secondary AI 112 may implement all functionality of the primary AI 110, a subset of the functionality of the primary AI 110, or additional functionality over the primary AI 110, or any combination thereof. The recommended action of the course of action prediction function 110b of the primary AI 110 can be compared to that of the secondary AI 112 for agreement. In such a manner, the secondary AI 112 acts as a digital instructor pilot (IP) watchdog for the primary AI. Where the primary AI 110 and the secondary AI 112 differ in either the primary cause, or in the probabilities of the determined causes exceed a maximum third threshold difference, the AIs may be locked out to recalculate the recommended course of action. Either the primary AI 110 or the secondary AI 112 may be designated as primary for the sake of resolving conflicts, prompting the non-primary designated AI to re-compute its cause in relation to the identified trends and conditions. The pilot may be informed of the disagreement through the natural language processing function 110c of the primary AI 110 and a cockpit intercom/speaker 120.

If the course of action prediction function 110b of the primary AI 110 and secondary AI 112 agree within the third threshold difference, the recommended course of action from the primary AI 110 may be fed to one or more safety validation functions, such as a command validation function 124, an envelope protection function 126, and a safety monitor 128. In some embodiments, information or data related to aircraft systems inputs 116 may be further fed to the command validation function 124, the envelope protection function 126, and/or the safety monitor 128 in addition to the recommended course of action to assist command validation function 124, the envelope protection function 126, and/or the safety monitor 128 in performing their functionality.

In some embodiments, the command validation function 124 acts as a threshold limiter for action directed by the primary AI 110. This ensures that commands issued from the primary AI 110 are valid and operable within the limits of the controls of the aircraft or vehicle. For example, if the primary AI 110 issues a command to set the thrust of engine 1 to 10000%, where the maximum allowed in 100%, the command validation function 124 will intercept the command from the primary AI 110. In some embodiments, after issuing an improper command, the command validation function 124 may lock the primary AI 110 out from issuing any further commands for a set amount of time. In some embodiments, the set amount of time may be in the range of milliseconds or seconds, and may be determined based on the processing capabilities of the primary AI 110 and/or secondary AI 112. In some embodiments, the command validation function 124 may retain a record of pervious aircraft states to enable an undo capability. If the command from the primary AI 110 is within the physical limits of the aircraft or vehicle, the command validation function 124 may pass the command to the envelope protection function 126.

In some embodiments, the envelope protection function 126 guards against exceeding the tolerances and/or performance capabilities of the aircraft or vehicle, or airspace requirements. Aircraft are designed to operate within specific performance envelopes to ensure safe and efficient flight. These performance envelopes are provided by the aircraft manufacturer and aviation authorities to ensure safe operations. The envelope protection function 126 receives data regarding the current flight status of the aircraft or vehicle such as control surface positions, engine power, airspeed, altitude, flap positions, landing gear position, heading, pitch, roll, load factor, and the like, and compares those to the operational ranges allowed for the aircraft or vehicle.

For example, while turning limits can vary depending on factors such as airspeed, altitude, and weight, for a typical commercial airliner like the Boeing 747, the maximum bank angle during a turn is usually around 25 to 30 degrees. If extreme maneuvers or high bank angles were attempted beyond the designed limits, those maneuvers could lead to structural stress, loss of control, or other safety issues. In another example, if the speed of the aircraft is at a minimum for a given conditions (e.g., wind speed, flap position, rate of climb/decent, and the like), a further reduction in thrust may result in the aircraft experiencing a stall and loss of lift. The envelope protection function 126 compares the current states of the aircraft or vehicle to the directed and/or structural limitations of the aircraft, and may prevent the primary AI 110 from performing an action that would result in operation outside the operating envelope of the aircraft of vehicle.

In some embodiments, the envelope protection function 126 may cause a hard stop of the action where the command would cause the aircraft or vehicle to exceed a first operating envelope designed to protect the aircraft from structural damage. In some embodiments, the envelope protection function 126 may require action by the pilot (voice confirmation, authorization, etc.) where the command may cause the aircraft or vehicle to exceed a second operating envelope—for example, a comfort envelope for passenger aircraft in a non-emergency situation. In some embodiments, the envelope protection function 126 may have a third operating envelop for emergency situations where structural damage may be tolerated to prevent/limit loss of life (e.g., cabin depressurization, fire, impact with the ground, etc.).

If the command from the primary AI 110 maintains the aircraft or vehicle within the allowed operating envelope(s), the envelope protection function 126 will forward the command to the safety monitor 128.

In some embodiments, the safety monitor 128 may be a further AI, a pseudo-AI, or the like. The safety monitor 128 operates as a predictive algorithm to determine the state of the aircraft in the future based on the command issued by the primary AI 110. The safety monitor 128 receives input regarding the aircraft or vehicle state and position, such as geographic position, altitude, speed over ground, current vector, and the like. Based on the input, the safety monitor 128 will predict the future state of the aircraft or vehicle based on the command issued by the primary AI 110. In some embodiments, where the future position results in an unsafe condition within a first time period, the safety monitor 128 may block the command from the primary AI 110. In some embodiments, the safety monitor 128 may require further action from the pilot (e.g., authorization or the like) where the command from the primary AI 110 will place the aircraft or vehicle in an unsafe position in a second time period, where the second time period is further out than the first time period.

For example, where the primary AI 110 issues a command to reduce flaps during a landing, the safety monitor 128 may determine that the aircraft will lose lift within the first time period, and block the command. If the reduction in flaps commanded is not predicted to result in losing lift in the first time period, but will result in losing lift if the reduction in flaps is maintained by the second time period, the safety monitor 128 may block the command unless a voice authorization is detected by the pilot. In the event that the safety monitor 128 predicts no unsafe position or state of the aircraft within the first or second time periods, the safety monitor 128 will pass the command to the course of action execution function 130.

In some embodiments, the safety monitor 128 may further implement deterministic safety routines, and issue commands to the flight control computer as well. Some examples may include collision avoidance and aircraft recovery commands. In some embodiments, the safety monitor 128 may receive common operating picture information or data from the flight systems 116 either directly or as a pass-through from the primary AI 110, system monitoring AI 114, or the like.

The course of action execution function 130 is a simplified vehicle operation interface that connects with the controls 132 of the aircraft or vehicle. In the case of an aircraft those controls may include: the auto throttle; the autopilot, directing aircraft heading, altitude, airspeed, rate of climb (decent), rate of turn, and the like; radios, speaker/intercom controls; a flight management system (FMS); a vehicle management system (VMS); and the like. The course of action execution function 130 simplifies the operation of the aircraft to a point such that a single command such as "climb to 10,000 feet on a heading of 120," may result in multiple actions including increasing thrust, positioning appropriate control surfaces, and activating cabin oxygen systems. The course of action execution function 130 also feeds back to the primary AI 110 natural language processing function 110c where needed to facilitate internal or external communications. For example, when the command is a course change, the course of action execution function 130 may also feed back the course change to the natural language processing function 110c of the primary AI 110 to contact air traffic control through the onboard radio 122 and inform them of the course change. In some embodiments, the internal communications may consist of informational notifications or cues to the pilot or crew that previously blocked commands require pilot concurrence prior to execution. For example, where the command validation function 124, envelope protection function 126, or safety monitor 128 (all discussed below) block a command from the primary AI 110, that information may be fed back to the natural language processing function 110c to generate the appropriate dialog or notification to the pilot or crew.

For example, vibration sensors and thermocouples in a transmission may be input into the system monitoring AI 114, which can recognize rising temperatures and rising vibration readings as a trend over time. This identified trend data may then be fed from the system monitoring AI 114 to the diagnostic function 110a of the primary AI 110. The primary AI 110 may then determine that there is a 65% chance a bearing in the transmission is failing, a 30% chance that it is due to environmental conditions, and a 5% chance that it is related to a erroneous sensor.

The course of action prediction function 110b receives the output of the diagnostic function 110a. In this case, because the probability that a bearing in the transmission is failing is the most likely cause, and because the bearing failure is the only case that exceeds a threshold possibility of 50%, the course of action prediction function 110b may determine that the aircraft needs to land as soon as possible, and determine commands to generate dialog informing the pilot of the potential failure and the recommend landing. The commands to generate the dialog informing the pilot of the potential failure are fed to the natural language processing function 110c of the primary AI 110 which will generate, for example, dialog stating "Captain, we have a potential failure of a bearing in the transmission of the #1 engine. The recommended course of action is to land as soon as possible. Please let me know if you would like me to plot a course to the nearest airport." The exemplary dialog will be translated into audio data by the audio outputs 118 of the DCP and sent to the cockpit speaker and/or pilot intercom 120.

Because, in this scenario, there is no actual input at this point to any flight controls, the command validation function 124, envelop protection function 126, and safety monitor 128, as well as the course of action execution function 130, may not have any input directed towards them. In some embodiments, the commands may still be routed through the command validation function 124, envelop protection function 126, and safety monitor 128, as well as the course of action execution function 130 to have the natural language processing function 110c generate the exemplary dialog above.

In another example, cabin pressure and temperature may be fed to the system monitoring AI 114. If cabin pressure drops below (or rises above) a first threshold (or rate threshold), and/or cabin temperature drops below (or rises above) a second threshold (or rate threshold), the system monitoring AI 114 may issue alarm conditions to the primary AI 110 and secondary AI 112. For example, where a sudden depressurization is detected and results in the cabin pressure falling below a first threshold. A cabin depressurization alarm may be sent by the system monitoring AI 114 to the primary AI 110 and secondary AI 112. In combination, a low cabin temperature trend may be identified, and when the cabin temperature decreases below a second threshold, a cabin low temperature alarm may be identified. The system monitoring AI 114 may then send the cabin low temperature trend, or information indicating or associated with the trend, to the primary AI 110 and secondary AI 112 along with a cabin low temperature alarm. The diagnostic function 110a of the primary AI 110 may determine from data that there is, for example, a 99% chance a cabin depressurization event occurred, and a 1% chance of a multiple failed sensors.

This information may again be fed to the course of action prediction function 110b. However, in this case, the casualty procedures may call for an immediate descent to below 10,000 ft. The command from the course of action prediction function 110b may be to descend to 10,000 ft. and attempt to confirm pilot responsiveness. The command to descend to 10,000 ft. will be processed by the command validation function 124, envelope protection function 126, and safety monitor 128. Barring any obstacles such as mountains or the like in the flight path, the command may be passed through each to the course of action execution function 130. The course of action execution function 130 will translate the commands to the autopilot or flight control computer 156 to cause the aircraft to descend to the new altitude.

Additionally, the command and diagnoses may be passed to the natural language processing function 110c, either through the command validation function 124, envelop protection function 126, safety monitor 128, and course of action execution function 130, or directly. A notification may be generated to solicit a response from the captain or crew, informing the captain and co-pilot of the loss of cabin pressure, and informing the captain and/or co-pilot to descend to 10,000 ft. In some embodiments, in the event that no response is received from the pilot in a certain time period, or cockpit video confirms pilot inactivity or incapacitation, the DCP 100 may initiate aircraft procedures (e.g., descending to 10,000 ft.) on its own. Further dialog may be generated to be sent out over the radio 122 to inform nearest air traffic control of the emergency and altitude change. Information may also be sent over various other radio and data channels to inform third parties such as the manufacturer and/or maintenance facilities of the emergency.

In another example, the DCP 100 may be trained to key on certain voice commands from operators. For example, a keyword may be stated, or input may be activated such as a button push or the like, cueing the DCP 100 that a voice command is forthcoming. For example, the pilot may state something such as "DCP, perform pre-flight weight calculations" which may be received though the intercom 120. This audio may be fed into the audio inputs and translated to audio information or data by the audio input 138 circuits. In some embodiments, conditioning may be performed by the signal conditioning function 136 to remove any background noise, static, clipping, or the like. The audio information or data may be transferred to a text to speech function 134 which translates audio information or data received into text data, or information able to be processed by the natural language processing function 110c of the primary AIs 110. The primary AI 110 may perform the necessary computations, in the instant example for performing pre-flight weight calculations, and generate data to report the completed information back to the pilot, which may be translated into audio data, information, or signaling by the audio outputs 118, and recited to the pilot through the intercom 120. In other situations, where further action is necessary, such as where a pilot directs the DCP to tune radios or interact with flight systems, navigation systems, autopilots, or the like, after the speech input is processed by the natural language processing function 110c of the primary AI 110, further signaling, information, or data may be transferred to the diagnostic function 110a or the course of action prediction function 110b of the primary AI 110, to the secondary AI 112, or further to the command validation function 124, envelop protection function 126, safety monitor 128, and course of action execution function 130, as necessary to act on the input from the pilot.

The foregoing examples are merely to illustrate potential operation of the DCP 100 in accordance with some embodiments, and are not intended to be limiting. Additional foreseen capabilities include: assisting the captain or pilot in operating the aircraft or vehicle safely and efficiently, monitoring, cross-checking, and backing up the pilot flying on all procedures, checklists, radio calls, and the like, providing collision avoidance by alerting pilot flying or taking control, providing aircraft limit alerting to pilot flying through verbal feedback or by guarding the cockpit inceptors, managing radio communications as assigned by the captain, assisting with navigation by verifying route clearances, tuning radios, operating flight management systems, and the like, completing required paperwork such as flight plans, weight and balance calculations, maintenance logs, and the like; monitoring aircraft systems status and alert the captain of any abnormalities, aiding in decision making, planning, and situational awareness, or employing offensive weapons and defensive countermeasures based on "rules of engagement" in possible military applications. The DCP 100 should be ready to take over control at any time in case of emergency or pilot incapacitation. In some embodiments, commands from the DCP resulting in the repositioning of flight surfaces or systems may also result in the repositioning of the associated control mechanism (for example, thrust levers, flap levers, the flight stick, and the like). In some embodiments, sensors 166 or additional sensors 170 may include cockpit inceptor grip switches, or other mechanisms on, or related to, flight controls for registering positive pilot control of the aircraft. In such cases, the cockpit inceptor grip switches may be utilized to override any commands from the DCP 100 affecting any flight surfaces or preventing control of any flight actuators 162 from being implemented, where the cockpit inceptor grip switches show active control by the pilot, co-pilot, or the like. In some embodiments, the DCP 100 may be triggered to automatically take control of the aircraft where the cockpit inceptor grip switches indicate the pilot, co-pilot, or the like, are not in active control.

Figure 1B:
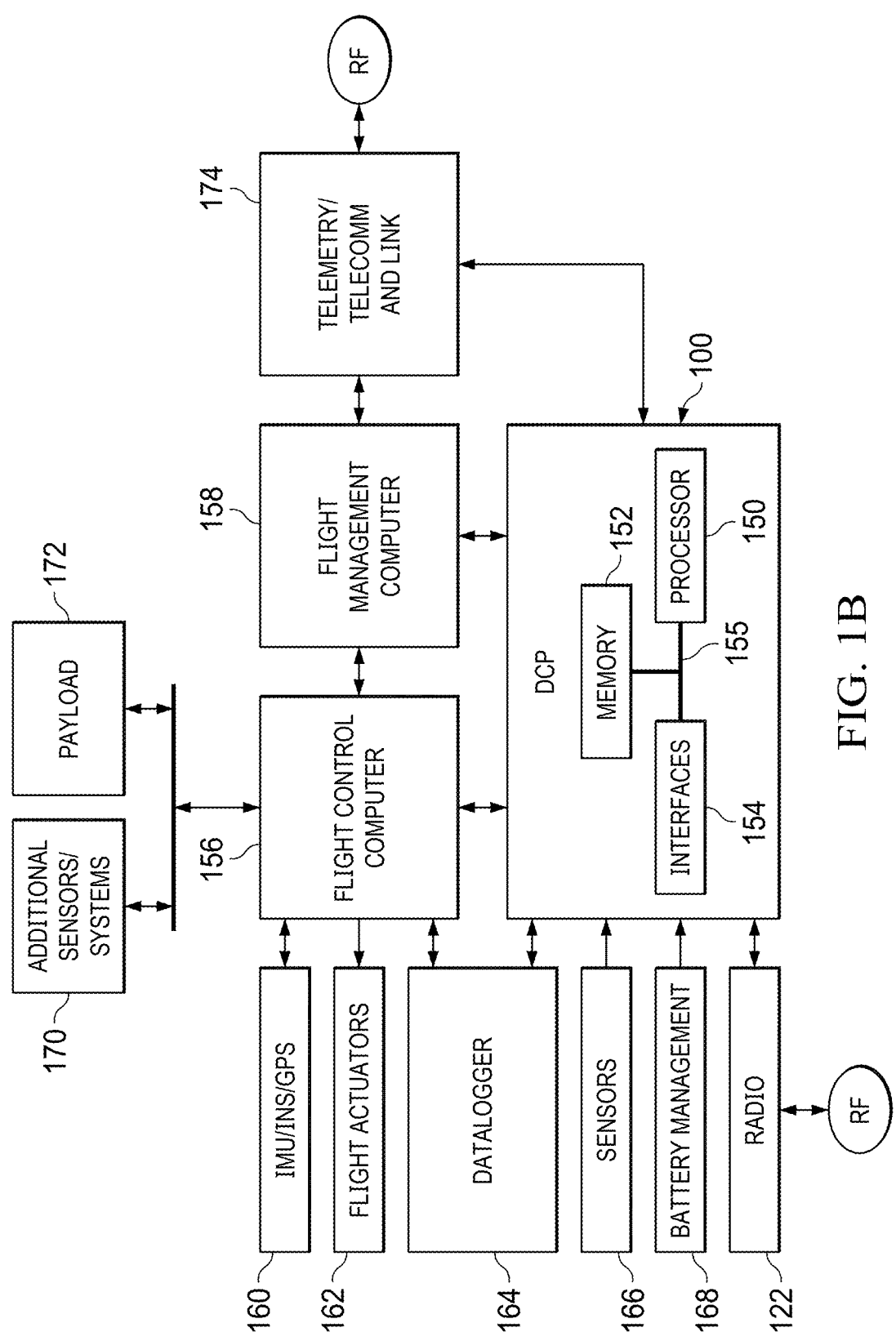
FIG. 1B is a diagram showing hardware of an AI-powered DCP 100 in an aircraft according to some embodiments.

FIG. 1B is a hardware diagram of a DCP 100 integrated into flight systems in an aircraft, according to some embodiments. The DCP 100, or each AI in the DCP 100, may include one or more processors 150 and one or more computer readable medium (such as memory 152) storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The DCP 100 may have at least one processor 150 and at least one memory 152, such as a non-transitory computer readable medium, and may include computer program code, that is configured to, with the at least one processor, provide the propulsion unit monitoring. The memory 152 may be a single component or it may be implemented as one or more separate components some or all of which may be integrated or removable and may provide permanent, semi-permanent, dynamic, or cached storage.

The one or more processors 150 are configured to read from and write to the at least one memory 152. The processor may also comprise a bus 155 or an output interface via which data or commands are output by the processor 150 and an input interface via which data or commands are input to the processor 150. The memory 152 stores a computer program including computer program instructions that control the operation of one or more of the primary AI 110, secondary AI 112, system monitoring AI 114, and possibly the overall DCP 100 system, when loaded into the processor. The computer program instructions provide the logic and routines that enable the apparatus to perform the engine monitoring methods and implement the engine monitoring systems. The processor 150, by reading the memory 152, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

The DCP may include additional interfaces 154 connected to the bus 155 through which data, information, and signaling from various subsystems may be fed into the DCP 100 and stored into memory 152 or used by the processor 150. The various inputs to the DCP 100 may include interfaces with a flight control computer 156, a flight management computer 158, radios 122, sensors 166, a battery management system 168, and telemetry, telecom, or wireless link data or information, according to some embodiments. Further, the DCP 100 may be connected to an inertial measurement unit (IMU), an inertial navigation system (INS), and/or a global position system (GPS) 160, as well as the flight actuators 162 that position aircraft control surfaces and linkages, additional systems and sensors 170, and payload systems 172, through the flight control computer 156 or directly, according to some embodiments. In some embodiments, the DCP 100 may further have access to a data logger 164, black box, or the like, where access may be shared with the flight control computer 156.

Figure 2:
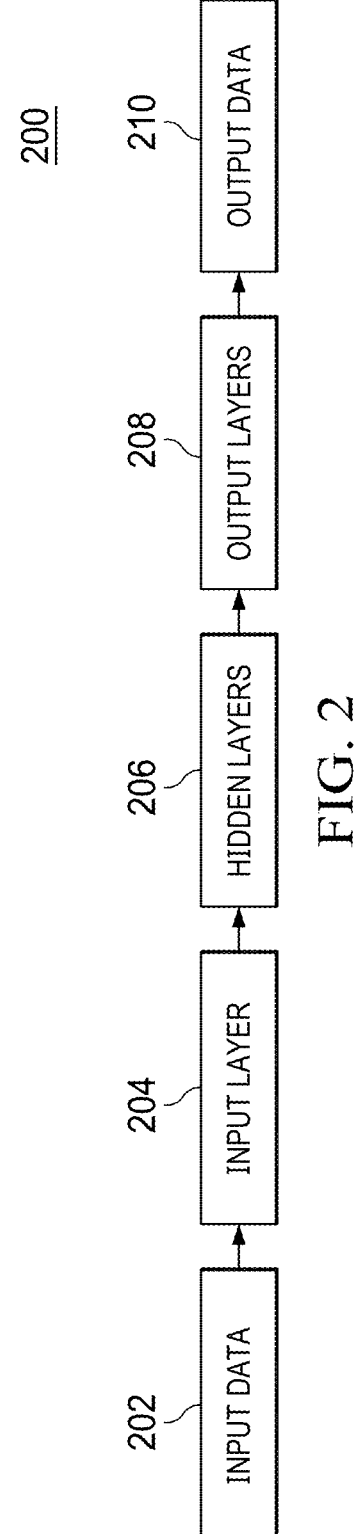
FIG. 2 is a symbolic diagram illustrating layers of an AI model 200 according to some embodiments.
Figure 3:
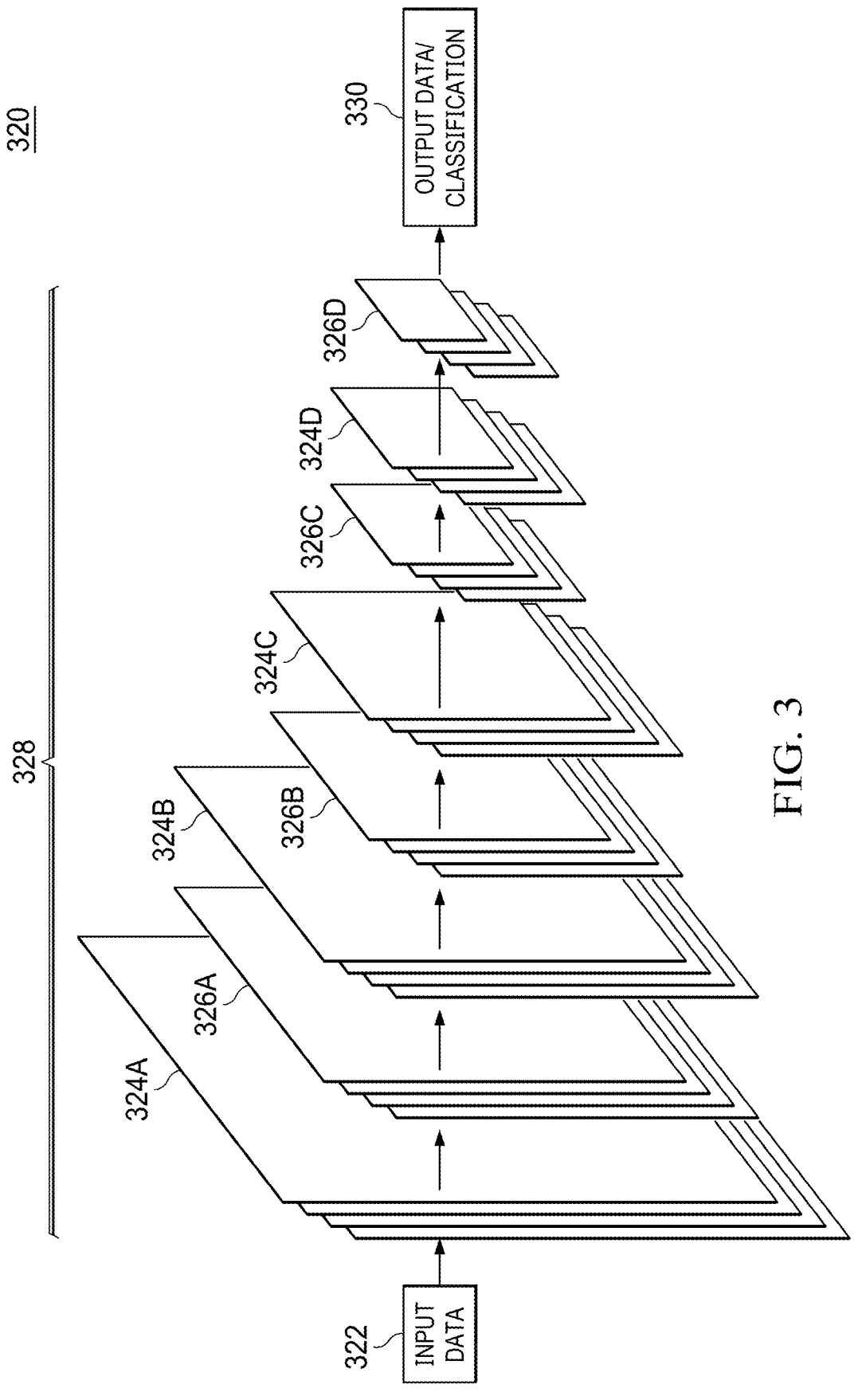
FIG. 3 is a symbolic diagram illustrating layers of an CNN AI model 320 according to some embodiments.

FIGS. 2-3 are symbolic diagrams illustrating architectures and training systems for AI models according to some embodiments. AI models are a set of mathematical functions that can be used to correlate incoming data with known elements, such as images, sounds, motions, flight paths, motion control or navigation data, voice samples, text data, and the like. Thus, an AI model may be a set of functions used for image, sound, text or motion recognition (for example ingesting technical manuals, maintenance videos or manuals, or training videos or manuals), for motion control, flight automation, voice recognition or voice interaction, or other AI processes. A commonly used AI model is a convolutional neural network (CNN). AI agents may be software or other implementations of an AI model, and may be implemented as a language acceptor that acts as a finite automaton that generates a "yes" or "no" output or a given input, and with the accepted language being an input that results in a 'yes' output.

FIG. 2 is a symbolic diagram illustrating layers of an AI model 200 according to some embodiments. An AI model 200 take in input data 202 though an input layer 204. The input layer 204 converts input data 202 into a format usable by hidden layers 206. For example, in an image recognition or computer vision AI model, the input data 202 may be, for example, an image with two dimensions. In other examples, for an autonomous landing agent, the input data may be fractal curves, for a vehicle health automation agent, the input data 202 may be operational data associated with various operational states, for a pilot voice assistant agent, the input data 202 may be audio data. In some embodiments, the input layer 204 may convert the input data 202 into a numeric representation such as a matrix with the data values reflected in the matrix. In other embodiments, the input layer 204 may convert multidimensional input data 202 into a single dimension array, apply filters, trim or normalize input data 202, or perform other pre-processing functions.

The input layer 204 provides the prepared data to a set of hidden layers 206. In a CNN, the hidden layers 206 provide one or more convolutions or filters. The hidden layers 206 may use filters that are trained by applying weights and biases to a variety of filters to identify desired features from the input data. In some embodiments, the hidden layers 206 may provide probabilities or other data related to extracted or identified features. A CNN may take advantage of hierarchical patterns in input data and assemble patterns of increasing complexity using smaller and simpler patterns in the filters of convolutional layers. Thus, CNNs utilize the hierarchical structure of the data they are processing. CNNs break input data down into smaller, simpler features, which are represented by the filters of the convolutional layers. These filters are applied to different regions of the input to extract the relevant information. As the network progresses through the layers, these features are combined and assembled into more complex patterns, allowing the network to learn increasingly abstract representations of the input.

An output layer 208 may be used to classify data received from the hidden layers 206. The output layer 208 uses the output from the hidden layers 206 to determine a probability that a particular input belongs to a particular classification. The output data 210 may contain the determined classification, or a range of classifications with or without probabilities associated with each classification depending on the needs of the particular application.

FIG. 3 is a symbolic diagram illustrating layers of a CNN AI model 320 according to some embodiments. A CNN AI model 320 may have hidden layers 328 that receive input data 322 and that perform mathematical processes on the input data 322 so that the input data 322 may be classified. The hidden layers 328 may include one or more convolutional layers 324A-324D, and one or more pooling layers 326A-326D. In some embodiments, each convolutional layer 324A-324D comprises one or more trainable filters or kernels that are applied to the data. Each convolutional layer 324A-324D convolves the input by a filter and passes the result to a next layer. The convolutional layers 324A-324D abstract input data to a feature map, or an activation map.

Pooling layers 326A-326D may be used after convolutional layers 324A-324D to reduce the dimensions of a feature map or other data by combining the outputs of neuron clusters at a layer into a single layer of a following layer. Thus, a pooling layer 326A-326D may combine small clusters of data to reduce the size of data before providing the reduced feature map to a next convolution layer 324A-324D. In some embodiments, pooling may be max pooling, where the maximum value in a local cluster may be provided as a neuron value to the next convolutional layer. In other embodiments, pooling may use average pooling by averaging the values of data in a particular cluster, and passing the average value as a neuron value to a next convolutional layer. The output from the hidden layers 328 may then be passed for classification to a classification element 330 such as an output layer, or the like.

Figure 4:
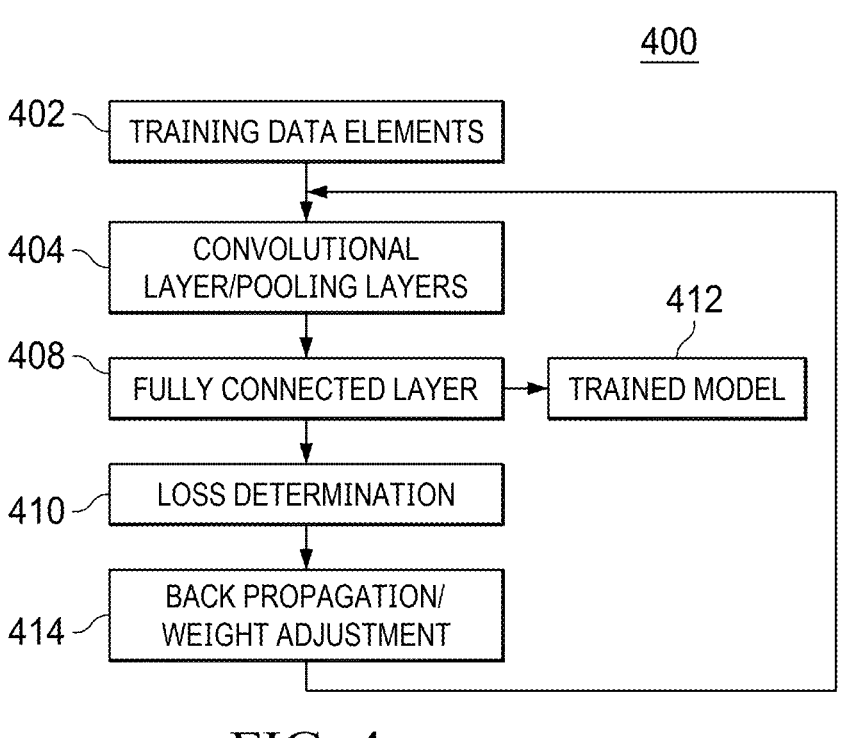
FIG. 4 is a system diagram illustrating a system 400 for training an AI agent such as the three AIs included in the DCP according to some embodiments.

FIG. 4 is a system diagram illustrating a system 400 for training an AI agent such as the three AIs included in the DCP according to some embodiments. An AI model of an AI agent uses a set of weights and biases used to make predictions, and the error for those predictions is calculated. For example, the predictions in a flight control system may be for whether a flight control input is correct, diagnosing and identifying a specific fault or casualty situation, responding to air traffic control requirements, or another type of prediction associated with the DCP system.

A training data set having one or more training data elements 402 is identified. The training data set provides data that can be used to train an AI model to identify, or avoid, certain types of data, and relate that data to specified categories of classifications. The desired classification may be a category of conceptual items that the AI agent should identify an analyzed data as belonging to, or not belonging to. For example, in relation to training the DCP for autonomous landing, the training data elements 402 may include data reflecting flight control inputs, and resulting flight operation classifications, with the AI agent trained to associate flight control inputs with a positive response to a command or external event affecting a vehicle and requiring correction. In yet another example, for aircraft health monitoring, the training data elements may include aircraft operational data and associated positive classification related to classifying or identifying aircraft operational states. It is, however, important that the information be carefully curated and that only vetted information is used in the training, with proper associated classification data, to avoid introducing errors into the AI agent.

The training data elements 402 may be preprocessed by an input layer (not shown) to prepare the training data elements 402 for filtering through one or more hidden layers such as convolution layers and pooling layers 404. The convolution layers 404 may have filters with adjustable weights or biases that affect the weight given to the respective filter when processing data. The training data elements 402 may be processed through the convolution layers and pooling layers 404, and the resulting data is output to one or more fully connected layers 408.

The fully connected layers 408 provide classification for each data element from the training data elements 402. In some embodiments, the fully connected layers 408 generate probabilities that each data element belongs to a particular classification. In some embodiments, a Softmax function is applied to data output from the convolutional layers and pooling layers 404. Softmax is an activation function that scales numbers or unnormalized final scores (logits) into probabilities. In some embodiments, a threshold may be applied to the probabilities or other output generated by the fully connected layers 408 to determine whether the data element affirmatively meets the classification criteria. For example, the system may use a 90% threshold for classification, and a training data element 402 that has a greater than 90% chance of belonging to a particular class is affirmatively classified as being in the class. Alternatively, a training data element that has a 20% chance of belonging to a particular class may be classified as being outside the class. In some embodiments, the system may use a lower threshold when classifying training data element 402 as being outside the class, with probabilities falling between the threshold resulting in the training data element being undefined or unknown with respect to the class. Therefore, the system may have a lower threshold of 10%, and a training data element 402 identified as having a 10% chance of being in the class may be identified as affirmatively being outside of the class, while a 25% chance of the training data element 402 being in the class may result in an undefined or unknown classification for the training data element 402.

In some embodiments, fully connected layers are feed forward neural networks. The fully connected layers 408 are densely connected, meaning that every neuron in the output is connected to every input neuron. In a fully connected layer 408, every output neuron is connected to every input neuron through a different weight. This is in contrast to a convolution layer where the neurons are not densely connected but are connected only to neighboring neurons within a width of a convolutional kernel or filter. However, in a convolutional layer, the weights are shared among different neurons, which enables convolutional layers to be used with a large number of neurons.

The input to the fully connected layers 408 is the output from the final convolutional layer or final pooling layer 404, which is flattened and then fed into the fully connected layer 408. During training of an AI agent, outputs from the fully connected layer 408 are passed to a loss determination element 410 that evaluates the results of the AI agent processing and provides data used to adjust weights and biases of the convolutional layers by back propagation or weight adjustment 414.

The loss determination element 410 specifies how training penalizes the deviation between the predicted output of the network, and the true or correct data classification. Various loss functions can be used, depending on the specific task. In some embodiments, the loss determination element 410 applies a loss function that estimates the error of a set of weights in convolution layers of a neural network. For example, errors in an output may be measured using cross-entropy. For example, in some training systems, the likelihood of any particular data element belonging to a particular class is 1 or 0, as the class of the data elements is known. Cross entropy is the difference between an AI agent predicted probability distribution given the data set and the distribution of probabilities in the training data set. The loss layer may use a cross entropy analysis to determine loss for a training data element 402 or set of training data elements 402.

Back propagation allows application of the total loss determined by the loss determination element 410 back into the neural network to indicate how much of the loss every node is responsible for, and subsequent updating of the weights in a way that minimizes the loss by giving the nodes with higher error rates lower weights, and vice versa. For example, in some embodiments, a loss gradient may be calculated, and used, via back propagation 414, for adjustment of the weights and biases in the convolution layers. A gradient descent algorithm may be used to change the weights so that the next evaluation of a training data element 402 reduces the error identified by the loss determination element 410, and where the optimization algorithm navigates down the gradient (or slope) of error. Once the training data element 402 are exhausted, or the loss of the model falls below a particular threshold, the AI agent may be saved, and used as a trained model 412.

Figure 5:
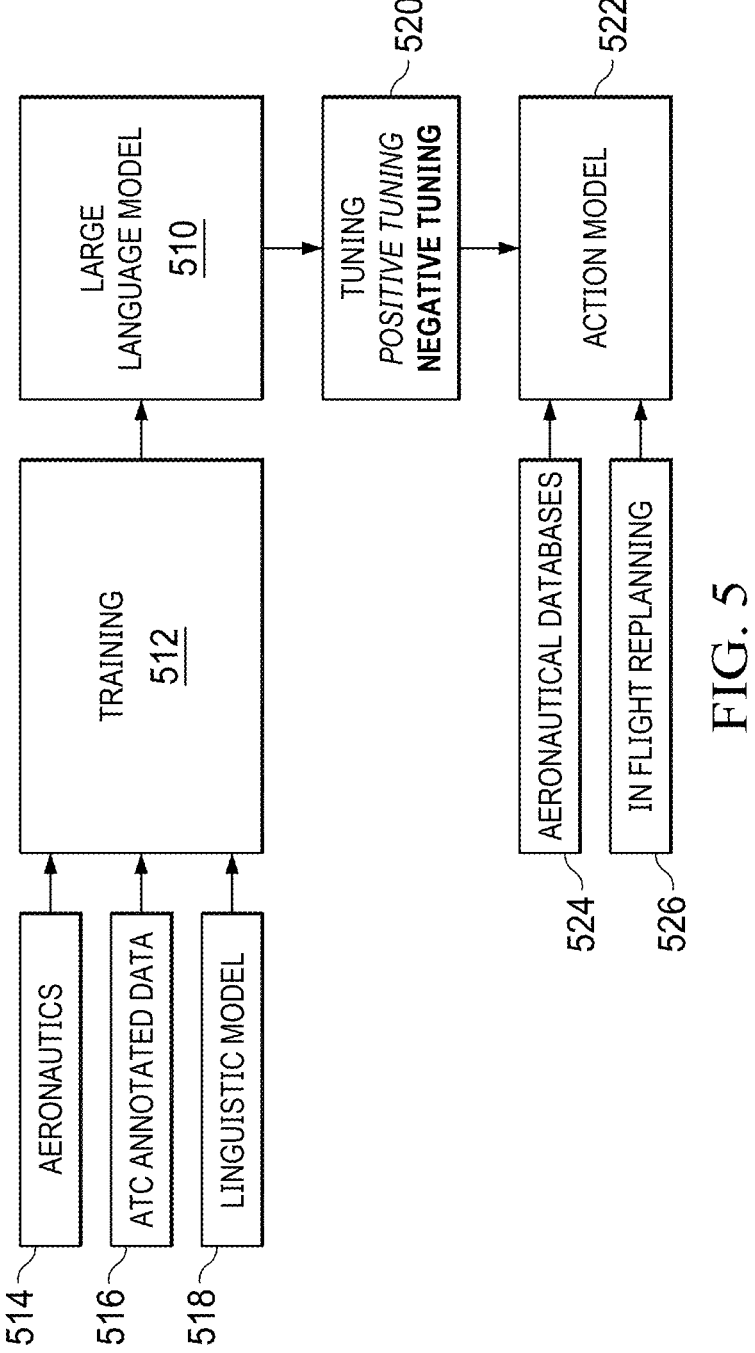
FIG. 5 is a logical diagram of the training for a primary AI and/or secondary AI, according to some embodiments.

FIG. 5 is a logical diagram of the training for the primary AI 110 and/or secondary AI 112 of the DCP 100, according to some embodiments. Because the DCP 100 may need to be certified by EASA and/or the FAA, it is important that a carefully curated training data set is utilized to perform the training process 512 of the large language model (LLM) AIs 510 forming the backbone of the primary AI 110 and/or secondary AI 112. In some embodiments, the training data may comprise aeronautical data 514, air traffic control annotated data 516, and a linguistic model 518.

The aeronautical data 514 comprises information about the aircraft or vehicle, including operating envelopes, performance data, structural and design details, casualty procedures, standard operating procedures, and the like. In some embodiments, the information may be sourced directly from the manufacturer(s) and be vetted information. In some embodiments, the training may include erroneous sensor data to train the primary AI 110 and/or secondary AI 112 to recognize a faulty input and respond accordingly.

In some embodiments, the air traffic control annotated data 516 comprises a verified data set of text annotated communications with various air traffic control entities and pilots. For example, a data set such as the ATCO2 Corpus data set as described by ATCO2 project (available at www.atco2.org) may be used. Each communication in the database has a human annotated text dialog of the conversation in the database. Accordingly, the ATC annotated data 516 represents a verified record of actual air traffic control communications on which to train the LLM AI 510. The LLM AI 510 may thus be trained on vetted data directly relevant to its use in the DCP 100 system and potentially result in more precise and relevant responses in an aircraft environment, while minimizing any necessary tuning later.

The linguistic model 518 is a data set for training the LLM AI 510 that may comprise a curated, diverse, and extensive collection of text data to ensure the model learns the intricacies of human language comprehensively. The data set should encompass a wide range of topics, genres, and linguistic styles to promote versatility in the LLM AI's 510 understanding and generation of language. This diversity can be achieved by incorporating sources such as books, articles, websites, social media posts, and more. Additionally, including multiple languages, dialects, and regional variations enhances the model's ability to handle linguistic nuances and adapt to different communication styles. Filtering and preprocessing of the data removes biases, irrelevant information, and potentially harmful content.

Furthermore, a well-constructed linguistic model data set should prioritize a balanced representation of both formal and informal language usage. This can involve including dialogues, colloquial expressions, and slang alongside more structured and academic text. Proper annotation of the linguistic model 518 data set with information like part-of-speech tagging, syntactic structures, and named entity recognition can augment the model's understanding of grammar and context. Regular updates to the linguistic model 518 data set may be needed to keep the model abreast of evolving language trends, new vocabulary, and changing linguistic patterns, ensuring its adaptability to the dynamic nature of human communication.

The training process 512 comprises feeding the aeronautical data 514, air traffic control annotated data 516, and linguistic model 518 into the LLM AI 510. In some embodiments, this training may significantly compare to that described with respect to one or more of FIGS. 2-4 above. For example, an untrained LLM AI 510 may be fed the aeronautical data 514, air traffic control annotated data 516, and linguistic model 518 to generate a pre-tuned primary AI 110 or secondary AI 112 as described above. In some embodiments, the untrained LLM AI 510 may further be fed data including common aviation and aircraft specific acronyms and established aviation jargon, such as using the phonetic alphabet ("alpha," "bravo," and the like), standard aviation numbers ("niner," "tree," "zero," and the like), and abbreviated communications ("roger," "over," "copy," and the like). Feeding the LLM AI 510 may initially set the trainable filters or kernels as described in the training process of FIG. 3 above, or the set of weights and biases used to make predictions as described in relation to FIG. 4 above, to create the LLM AI 510 used as a basis for the primary AI 110 or secondary AI 112, according to some embodiments.

Once the LLM AI 510 is trained, a tuning process 520 of the LLM AI 510 occurs to ensure proper responses. The tuning process 520 involves adjusting various parameters and hyper-parameters to enhance its performance and optimize its behavior. Initially, a set of default configurations may be established during the training phase, but fine-tuning becomes crucial to tailor the model to handle the rigors of co-piloting an aircraft. This process typically involves adjusting the learning rate, batch size, and regularization techniques to strike a balance between underfitting and overfitting, for example as described in relation to FIG. 4 above. Flight-specific data may be incorporated during fine-tuning to improve the model's proficiency in understanding and generating content related to aircraft and flight.

The tuning process 520 may be broken in to both positive and negative tuning. In the positive tuning, the LLM AI 510 may be fed information and simulations of proper flight control and procedures. In some embodiments, the positive tuning may comprise manual human adjustment of proper responses. In some embodiments, negative tuning may comprise real and/or simulated check flights curated by a human instructor pilot. Responses of the LLM AI 510 may be corrected in situ. For example, where sensors 166 or additional sensors 170 include cockpit inceptor grip switches, or other mechanisms for registering positive pilot control of the aircraft, input showing the human instructor pilot taking control of the aircraft during a portion of a check flight may be used as feedback to correct improper operation.

The tuned LLM AI may then be saved as an action model 522. The action model 522 may be the basis for the primary AI 110 and/or secondary AI 112. The action model 522 may further be bundled with aeronautical databases 524 and/or in-flight re-planning software 526. The training of the LLM AI 510 may include training on referencing and implementing the aeronautical databases 524 and/or in-flight re-planning software 526. For example, where the LLM AI 510 is not trained on the specific actions for a certain scenario (e.g., loss of hydraulic pressure), the LLM AI 510 may be trained to recognize the scenario, to access the aeronautical databases 524, or a specific set of information within the aeronautical databases 524, to retrieve the correct procedure for a loss of hydraulic pressure, and to implement, or assist in implementing that procedure. The aeronautical databases may comprise such information as airspace limitations, air traffic control areas of operation and contact information, airport locations, airport contract information, airport/runway maps, operating manuals, technical manuals, casualty procedures, checklists, and the like. The in-flight re-planning software 526 may include software to properly route the aircraft to different destinations.

Figure 6:
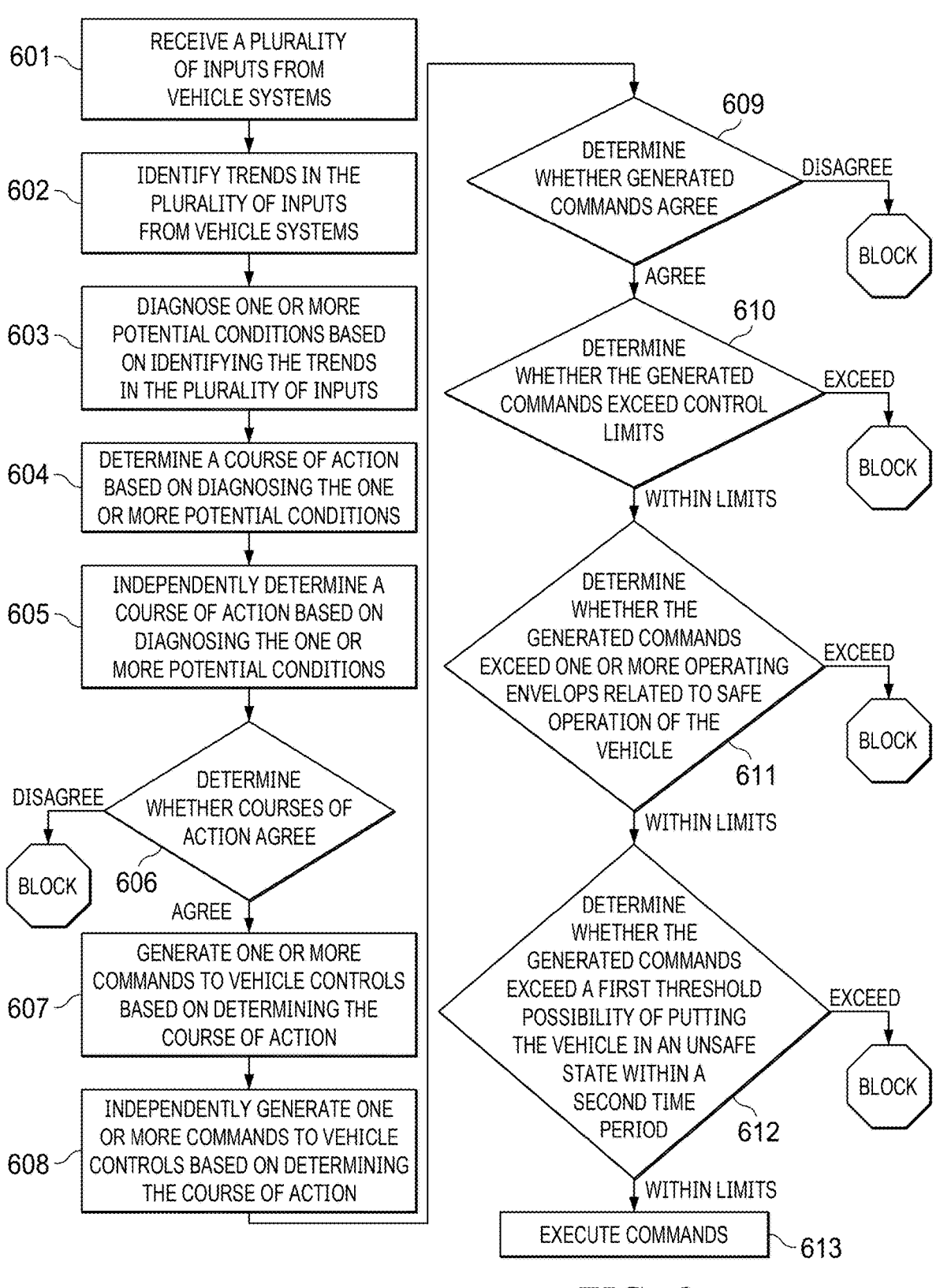
FIG. 6 is an exemplary method for operation of a digital co-pilot system, according to some embodiments.

FIG. 6 is a method for operation of the DCP 100, according to some embodiments. In block 601, the DCP 100 may receive a plurality of inputs from various aircraft or vehicle systems. Inputs may include such items as power produced by each engine; transmission system parameters; fuel flow and tank levels; temperatures of various systems, fluids, and exhausts; hydraulic pressures and fluid levels; power distribution and component status of various parts of the electrical system; the health of communication, navigation, and surveillance systems; and the like. The inputs may be received over data lines directly from sensors, as data lines from a flight control computer, or the like, or a combination of input formats and mechanisms.

In block 602, a processing agent may identify trends in received inputs from a plurality of vehicle systems. The processing agent may be a first AI. The trend may be slow, for example over multiple hours, flights, or even days. Additionally, if parameters drop below (or rises above) a thresholds (or rate thresholds), the processing agent may issue alarm conditions.

In block 603, a processing agent diagnoses one or more potential conditions based on the identified trends in the plurality of inputs. The processing agent for block 603 may be a second AI. A range of possible conditions may be predicted. If the conditions meet a threshold possibility, those potential causes exceeding the probability threshold may be reported for further processing.

In block 604, a course of action may be determined based on the diagnosed one or more potential conditions by a processing agent. The processing agent for step S103 may be the second AI in some embodiments. The processing agent may formulate text dialog to audio outputs 118 to inform the captain, crew, air traffic control, and/or the passengers of the situation through the intercom/speaker 120 or one or more attached radios 122.

In block 605, a processing agent may independently determine a course of action based on the diagnosed one or more potential conditions. In some embodiments, the processing agent is a third AI that is trained similarly to the second AI.

If block 605 is performed, then block 606 may also be performed. In block 606, a determination may be made on whether the courses of action determined in block 604 and 605 agree. In some embodiments, the courses of action may need to agree within a threshold difference of probabilities. If the courses of action agree, the courses of action may be passed on. If the courses of action disagree, further processing for the recommended course of action may be blocked. In some embodiments, notification may be provided for the disagreement to the pilot, crew, air traffic control, or third-party maintenance crews. The notification may be a voice notification, a warning light, a text notification to a display, or a notification sent to a wireless tablet, or the like, according to some embodiments. The notification may further contain information sufficient to determine the nature of the disagreement, or a link to a log where technical details of the disagreement may be reviewed later by maintenance facilities or the like, according to some embodiments.

In block 607, a processing agent may generate one or more commands to a vehicle control system based on the determined course of action. In some embodiments, the processing agent for step S106 may be the second AI. In some embodiments, the commands may include specific inputs to a flight management system, such as to descend or ascent to specific altitudes, or turn to specific headings, or the like. In some embodiments, the commands may include audible or visual notifications to passengers or crew. In some embodiments, the commands may include a list of actions, such as multiple flight commands, audible or visual cues, or notifications to external control or maintenance entities.

Block 608 is an optional step. In block 608, a processing agent may independently generate one or more commands to a vehicle control system based on the determined course of action. In some embodiments, the processing agent may be the third AI. Similar to block 607, the commands may include specific inputs to a flight management system, audible or visual notifications to passengers or crew, a list of actions, or notifications to external control or maintenance entities, according to some embodiments.

If optional block 608 is performed, block 609 may also be performed. In block 609, a determination may be made on whether the commands generated in block 607 and 608 agree. If the commands agree within a given threshold of agreement, those commands may be passed on for further processing. In some embodiments, when the generated commands are not the same, further processing of those commands may be blocked. In some embodiments, notification may be provided for the disagreement to the pilot, crew, air traffic control, third-party maintenance crews, or the like.

Blocks 610 through 612 are optional steps depending on the amount of reliability necessary for the system, and particular implementation.

In block 610, a processing agent may perform a check to determine whether the generated commands exceed the control bounds of the controls in the vehicle or aircraft. If the issued command exceeds allowable limits, then the generated command or commands may be blocked from further processing. In some embodiments, the system may be locked out for a predetermined time period from issuing commands to the flight systems. The processing agent for block 610 may be an AI or other decision-making module.

In block 611, a processing agent may perform a check to determine whether the generated commands exceed one or more operating envelops related to the safe operation of the vehicle or aircraft. If the issued command results in operation out of the operating envelope of the aircraft (for example, exceeding speed, bank, rate of climb or descent limits, or the like), then the generated command or commands may be blocked from further processing. The processing agent for block 611 may be an AI or other decision-making module.

In block 612, a processing agent may perform a check to determine whether the generated commands exceed a threshold probability of putting the vehicle or aircraft in an unsafe state within a predetermined time period. If the issued command puts the vehicle or aircraft in an unsafe state within the predetermined time period, then the generated command or commands may be blocked from further processing. For example, if a command to descend results in hitting a mountain within the predetermined time period, the command may be blocked. The processing agent for block 612 may be an AI or other decision-making module.

In block 613, the generated command(s) may be passed to a flight management system (FMS), a vehicle management system (VMS), onboard systems or communication systems, or the like, to carry out the generated commands. For example, where the command is something like climb to a specific altitude on a given heading, the generated command(s) may cause the FMS to increase thrust, position the elevators to cause an aircraft to climb until the specific altitude is reached, and the ailerons to position to turn to the desired heading, and then to stabilize the thrust, elevators, and ailerons once the desired altitude and heading is achieved. In another example, where the generated command(s) include notifications, data may be send to onboard systems such as the cockpit intercom to notify the crew, or to external communication systems to send data or signaling where the generated command(s) include notification to air traffic control, third-party maintenance facilities, or the like.

In a first possible embodiment, a system is provided, including, at least one processor, a first artificial intelligence (AI), where the first AI is trained based on a linguistic data set, air traffic control annotated data set, and an aeronautics data set, where the first AI is tuned using one or more check flights with a human copilot, and where the first AI further includes an aeronautical database and is trained to perform in-flight route re-planning, and at least one non-transitory computer readable memory connected to the at least one processor and including computer program code, where the at least one non-transitory computer readable memory and the computer program code are configured, with the at least one processor, to cause the system to perform at least receiving a plurality of inputs from a vehicle's operating systems, where the plurality of inputs include engine parameters, control system parameters, or electrical system parameters, identifying first trends in the plurality of inputs, sending the first trends to the first AI, diagnosing, by the first AI, one or more potential first conditions based on identifying the first trends in the plurality of inputs, determining, by the first AI, a first course of action based on diagnosing the one or more potential first conditions, generating, by the first AI, one or more first commands to vehicle controls based on determining the first course of action, and executing the first commands to control the vehicle operation.

In some possible embodiments, the instruction may further cause the system to perform generating, by the first AI, dialog data based on determining the first course of action, converting the dialog data to audio data, and outputting the audio data to at least one of a vehicle radio, intercom, or speaker. In some possible embodiments, the instruction may further cause the system to perform determining whether the one or more first commands to the vehicle controls exceed control limits, passing the first commands for further processing based on determining the first commands to the vehicle controls do not exceed control limits, and blocking further commands from the first AI for a first time period based on determining the first commands to the vehicle controls exceed control limits. In some possible embodiments, the instruction may further cause the system to perform determining whether the first commands to the vehicle controls cause the vehicle to exceed one or more operating envelops related to safe operation of the vehicle, passing the generated commands for further processing based on determining the first commands to the vehicle controls do not cause the vehicle to exceed the one or more operating envelops related to safe operation of the vehicle, and blocking the first commands based on determining the first commands to the vehicle controls cause the vehicle to exceed one or more of operating envelops related to safe operation of the vehicle. In some possible embodiments, the instruction may further cause the system to perform determining whether the first commands to the vehicle controls cause the vehicle to exceed a first threshold possibility of putting the vehicle in an unsafe state within a second time period, passing the generated commands for further processing based on determining the first commands to the vehicle controls do not cause the vehicle to exceed the first threshold possibility of putting the vehicle in an unsafe state within the second time period, and blocking the first commands based on determining the first commands to the vehicle controls cause the vehicle to exceed the first threshold possibility of putting the vehicle in the unsafe state within the second time period.

In a second possible embodiment, a digital co-pilot system is provided, including a first processing agent that receives input from a plurality of vehicle systems and is trained to recognize and report a trend in data from the vehicle systems, a second processing agent that receives data regarding the recognized trend from the first processing agent, where the second processing agent is configured to diagnose a first potential condition related to the received data regarding the recognized trend, provide a first recommended course of action based on diagnosing the first potential condition, and send one or more commands to a course of action execution module based on the first recommended course of action, and the course of action execution module that interfaces with control system of the vehicle to cause the vehicle to execute the one or more commands based on the first recommended course of action.

In some possible embodiments of the digital co-pilot system, one or more of the first processing agent and the second processing agent include an artificial intelligence (AI). In some possible embodiments, the second processing agent AI is trained based on a linguistic data set, air traffic control annotated data set, and an aeronautics data set, where the second processing agent AI is tuned using one or more check flights with a human copilot, and where the second processing agent further includes an aeronautical database and is trained to perform in-flight route re-planning. In some possible embodiments, the system further includes a third processing agent that receives the data regarding the recognized trend from the first processing agent and is configured to diagnose a second potential condition related to the received data regarding the recognized trend, and provide a second recommended course of action based on diagnosing the second potential condition, where a final recommended course of action is determined based on the second diagnosed potential condition or the second recommended course of action by the third processing agent matching at the first diagnosed potential condition or the first recommended course of action by the second processing agent. In some possible embodiments, digital co-pilot system further including a safety processing agent configured to block execution of the one or more commands based on the one or commands exceeding a control limit of the vehicle. In some possible embodiments, the safety processing agent is further configured to lock out the second processing agent from issuing further commands for a first time period based on blocking the one or more commands. In some possible embodiments, the digital co-pilot system further includes a safety processing agent configured to block execution of the one or more commands based on the one or commands exceeding one or more operating envelopes related to the vehicle. In some possible embodiments, the digital co-pilot system further includes a safety processing agent configured to block execution of the one or more commands based on the one or commands exceeding a threshold possibility of putting the vehicle in an unsafe state within a second time period.

In a third possible embodiment, a method is provided, including receiving a plurality of inputs from a vehicle operating systems, where the plurality of inputs include engine parameters, control system parameters, or electrical system parameters, identifying one or more first trends in the plurality of inputs, diagnosing one or more first potential conditions based on the first trends, determining a first course of action based on diagnosing the one or more potential conditions, and generating one or more first commands to vehicle controls based on determining the first course of action.

In some embodiments, the method further includes determining whether the first commands exceed control limits, passing the first commands for further processing based on determining the first commands to the vehicle controls do not exceed control limits, and blocking further commands for a first time period based on determining the first commands to the vehicle controls exceed control limits. In some embodiments, the method further includes determining whether the first commands to the vehicle controls exceed one or more operating envelops related to safe operation of the vehicle, passing the first commands for further processing based on determining the first commands to the vehicle controls do not exceed the one or more operating envelops related to safe operation of the vehicle, and blocking the first commands based on determining the first commands to the vehicle controls exceed one or more of operating envelops related to safe operation of the vehicle. In some embodiments, the method further includes determining whether the first commands to the vehicle controls cause the vehicle to exceed a first threshold possibility of putting the vehicle in an unsafe state within a second time period, passing the first commands for further processing based on determining the first commands to the vehicle controls do not cause the vehicle to exceed the first threshold possibility of putting the vehicle in the unsafe state within the second time period, and blocking the first commands based on determining the first commands to the vehicle controls cause the vehicle to exceed the first threshold possibility of putting the vehicle in an unsafe state within the second time period. In some embodiments, a first processing agent performs the receiving the plurality of inputs from the vehicle's operating systems, and the identifying trends in the plurality of inputs, a second processing agent and a third processing agent each individually perform the diagnosing one or more potential first conditions based on identifying the first trends in the plurality of inputs, the determining the first course of action based on diagnosing the one or more potential first conditions, and the generating the one or more first commands to the vehicle controls based on determining the first course of action, and the method further includes performing at least one of: performing comparing a results of the at least one of the diagnosed one or more potential first conditions independently determined by the second processing agent and third processing agent, and determining, based on comparing the results of the at least one of the diagnosed one or more potential first conditions independently determined by the second processing agent and third processing agent, whether the second processing agent and the third processing agent agree on at least one potential first condition within a second probability threshold; or performing comparing a results of the determined first course of action independently determined by the second processing agent and third processing agent, and determining, based on comparing the results of the determined first course of action independently determined by the second processing agent and third processing agent, whether the second processing agent and the third processing agent agree on the determined first course of action. In some embodiments, the method further includes passing, based on determining the second processing agent and the third processing agent agree on the at least one potential condition within the second probability threshold, or based on determining the second processing agent and the third processing agent agree on the determined course of action, the generated one or more commands through a fourth validation. In some embodiments, the first processing agent is an artificial intelligence (AI) trained to recognize trends in vehicle systems; and where the second processing agent and third processing agents are AIs independently trained on a vehicle's systems, operation, operating procedures, and casualty procedures.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:

at least one processor;

a first artificial intelligence (AI), wherein the first AI is trained based on a linguistic data set, air traffic control annotated data set, and an aeronautics data set, wherein the first AI is tuned using one or more check flights with a human copilot, and wherein the first AI further includes an aeronautical database and is trained to perform in-flight route re-planning; and at least one non-transitory computer readable memory connected to the at least one processor and including computer program code, wherein the at least one non-transitory computer readable memory and the computer program code are configured, with the at least one processor, to cause the system to perform at least:

receiving a plurality of inputs from a vehicle's operating systems, wherein the plurality of inputs comprise engine parameters, control system parameters, or electrical system parameters;

identifying first trends in the plurality of inputs;

sending the first trends to the first AI diagnosing, by the first AI, one or more potential first conditions based on identifying the first trends in the plurality of inputs;

determining, by the first AI, a first course of action based on diagnosing the one or more potential first conditions;

generating, by the first AI, one or more first commands to vehicle controls based on determining the first course of action;

determining whether the one or more first commands to the vehicle controls exceed control limits;

passing the first commands for further processing based on determining the first commands to the vehicle controls do not exceed control limits; and blocking further commands from the first AI for a first time period based on determining the first commands to the vehicle controls exceed control limits; and executing the first commands to control the vehicle operation.

2. The system of claim 1, wherein the at least one non-transitory computer readable memory and the computer program code are further configured, with the at least one processor, to cause the system to perform at least:

generating, by the first AI, dialog data based on determining the first course of action;

converting the dialog data to audio data; and outputting the audio data to at least one of a vehicle radio, intercom, or speaker.

3. The system of claim 1, wherein the at least one non-transitory computer readable memory and the computer program code are further configured, with the at least one processor, to cause the system to perform at least:

determining whether the first commands to the vehicle controls cause the vehicle to exceed one or more operating envelopes related to safe operation of the vehicle;

passing the first commands for further processing based on determining the first commands to the vehicle controls do not cause the vehicle to exceed the one or more operating envelopes related to safe operation of the vehicle; and blocking the first commands based on determining the first commands to the vehicle controls cause the vehicle to exceed one or more operating envelopes related to safe operation of the vehicle.

4. The system of claim 1, wherein the at least one non-transitory computer readable memory and the computer program code are further configured, with the at least one processor, to cause the system to perform at least:

determining whether the first commands to the vehicle controls cause the vehicle to exceed a first threshold possibility of putting the vehicle in an unsafe state within a second time period;

passing the first commands for further processing based on determining the first commands to the vehicle controls do not cause the vehicle to exceed the first threshold possibility of putting the vehicle in an unsafe state within the second time period; and blocking the first commands based on determining the first commands to the vehicle controls cause the vehicle to exceed the first threshold possibility of putting the vehicle in the unsafe state within the second time period.

5. The system of claim 1, wherein the first AI receives signaling or data corresponding to cockpit inceptor grip sensors indicating positive control of the vehicle by a human.

6. A digital co-pilot system, comprising:

a first processing agent that receives input from a plurality of vehicle systems and that is trained to recognize and report a trend in data from the vehicle systems;

a second processing agent that receives data regarding the recognized trend from the first processing agent, wherein the second processing agent is configured to:

diagnose a first potential condition related to the received data regarding the recognized trend;

provide a first recommended course of action based on diagnosing the first potential condition; and send one or more commands to a course of action execution module based on the first recommended course of action; and the course of action execution module, wherein the course of action execution module is configured to interface with a control system of the vehicle and cause the vehicle to execute the one or more commands based on the first recommended course of action;

wherein one or more of the first processing agent and the second processing agent comprise an artificial intelligence (AI), and wherein the one or more of the first processing agent and the second processing agent receive signaling or data corresponding to cockpit inceptor grip sensors indicating positive control of the vehicle by a human.

7. The digital co-pilot system of claim 6, wherein the second processing agent AI is trained based on a linguistic data set, air traffic control annotated data set, and an aeronautics data set, wherein the second processing agent AI is tuned using one or more check flights with a human copilot, and wherein the second processing agent further includes an aeronautical database and is trained to perform in-flight route re-planning.

8. The digital co-pilot system of claim 6, wherein the system further comprises a third processing agent that receives the data regarding the recognized trend from the first processing agent and is configured to:

diagnose a second potential condition related to the received data regarding the recognized trend; and provide a second recommended course of action based on diagnosing the second potential condition;

wherein a final recommended course of action is determined based on the second diagnosed potential condition or the second recommended course of action by the third processing agent matching the first diagnosed potential condition or the first recommended course of action by the second processing agent.

9. The digital co-pilot system of claim 6, further comprising a safety processing agent configured to block execution of the one or more commands based on the one or more commands exceeding a control limit of the vehicle.

10. The digital co-pilot system of claim 9, wherein the safety processing agent is further configured to lock out the second processing agent from issuing further commands for a first time period based on blocking the one or more commands.

11. The digital co-pilot system of claim 6, further comprising a safety processing agent configured to block execution of the one or more commands based on the one or more commands exceeding one or more operating envelopes related to the vehicle.

12. The digital co-pilot system of claim 6, further comprising a safety processing agent configured to block execution of the one or more commands based on the one or more commands exceeding a threshold possibility of putting the vehicle in an unsafe state within a second time period.

13. A method, comprising:

receiving a plurality of inputs from a vehicle operating system, wherein the plurality of inputs comprise engine parameters, control system parameters, or electrical system parameters;

identifying one or more first trends in the plurality of inputs;

diagnosing one or more first potential conditions based on the first trends;

determining a first course of action based on diagnosing the one or more first potential conditions;

generating one or more first commands to vehicle controls based on determining the first course of action;

determining whether the one or more first commands exceed a first parameter, wherein the first parameter is one of a control limit, an operating envelopes related to safe operation of the vehicle, or a first threshold possibility of putting the vehicle in an unsafe state within a time period;

passing the one or more first commands for further processing based on determining the first commands to the vehicle controls avoid exceeding the first parameter; and blocking the one or more first commands or at least one further command based on determining that the one or more first commands exceed the first parameter.

14. The method of claim 13, wherein a first processing agent performs the receiving the plurality of inputs from the vehicle's operating systems, and the identifying the one or more first trends in the plurality of inputs;

wherein a second processing agent and a third processing agent each individually perform the diagnosing one or more potential first conditions based on identifying the first trends in the plurality of inputs, the determining the first course of action based on diagnosing the one or more potential first conditions, and the generating the one or more first commands to the vehicle controls based on determining the first course of action.

15. The method of claim 14, further comprising:

comparing a result of the at least one of the diagnosed one or more potential first conditions independently determined by the second processing agent and third processing agent; and determining, based on comparing the results of the at least one of the diagnosed one or more potential first conditions independently determined by the second processing agent and the third processing agent, whether the second processing agent and the third processing agent agree on at least one potential first condition within a second probability threshold.

16. The method for a digital co-pilot in a vehicle of claim 15, wherein the method further comprises passing, based on determining the second processing agent and the third processing agent agree on the one or more potential first conditions being within the second probability threshold, or based on determining the second processing agent and the third processing agent agree on the determined first course of action, the generated one or more commands through a fourth validation.

17. The method of claim 14, further comprising:

comparing a result of the determined first course of action independently determined by the second processing agent and the third processing agent; and determining, based on comparing the results of the determined first course of action independently determined by the second processing agent and the third processing agent, whether the second processing agent and the third processing agent agree on the determined first course of action.

18. The method of claim 14, wherein one or more of the first processing agent and the second processing agent comprise an artificial intelligence (AI).

19. The method for a digital co-pilot in a vehicle of claim 18, wherein the first processing agent is an artificial intelligence (AI) trained to recognize trends in vehicle systems; and wherein the second processing agent and the third processing agent are AIs independently trained on a vehicle's systems, operation, operating procedures, and casualty procedures.

20. The method of claim 14, wherein the one or more of the first processing agent and the second processing agent receive signaling or data corresponding to cockpit inceptor grip sensors indicating positive control of the vehicle by a human.

* * * * *